US005695837A

United States Patent [19]
Everaerts et al.

[11] Patent Number: 5,695,837
[45] Date of Patent: Dec. 9, 1997

[54] TACKIFIED ACRYLIC ADHESIVES

[75] Inventors: Albert I. Everaerts; Mark D. Purgett, both of Oakdale; Bradley S. Momchilovich, Stillwater, all of Minn.

[73] Assignee: Minnesota Mining and Manufacturing Company, St. Paul, Minn.

[21] Appl. No.: 425,812

[22] Filed: Apr. 20, 1995

[51] Int. Cl.$^6$ .................... C09J 4/02; C08F 8/04
[52] U.S. Cl. .............. 428/40.1; 428/41.8; 428/317.1; 442/149; 524/272; 524/484; 524/490; 525/221
[58] Field of Search ............... 524/272, 484, 524/490; 525/221; 428/40.1, 41.8, 317.1; 442/149

[56] References Cited

U.S. PATENT DOCUMENTS

| | | | |
|---|---|---|---|
| Re. 24,906 | 12/1960 | Ulrich | 206/59 |
| 4,078,132 | 3/1978 | Lepert | 526/76 |
| 4,181,752 | 1/1980 | Martens et al. | 427/54.1 |
| 4,243,500 | 1/1981 | Glennon | 204/159.12 |
| 4,311,759 | 1/1982 | Glennon | 428/345 |
| 4,329,384 | 5/1982 | Vesley et al. | 428/40 |
| 4,330,590 | 5/1982 | Vesley | 428/336 |
| 4,379,201 | 4/1983 | Heilmann et al. | 428/345 |
| 4,391,687 | 7/1983 | Vesley | 204/159.16 |
| 4,415,615 | 11/1983 | Esmay et al. | 428/40 |
| 4,514,554 | 4/1985 | Hughes et al. | 526/339 |
| 4,554,324 | 11/1985 | Husman et al. | 525/301 |
| 4,569,960 | 2/1986 | Blake | 524/145 |
| 4,619,979 | 10/1986 | Kotnour et al. | 526/88 |
| 4,629,766 | 12/1986 | Malatesta et al. | 525/222 |
| 4,726,982 | 2/1988 | Traynor et al. | 428/213 |
| 4,737,559 | 4/1988 | Kellen et al. | 526/291 |
| 4,818,610 | 4/1989 | Zimmerman et al. | 428/345 |
| 4,843,134 | 6/1989 | Kotnour et al. | 526/318.4 |
| 4,894,259 | 1/1990 | Kullen | 427/208.8 |
| 4,895,738 | 1/1990 | Zimmerman et al. | 427/208.8 |
| 4,952,639 | 8/1990 | Minomiya et al. | |
| 4,952,650 | 8/1990 | Young et al. | 526/194 |
| 4,988,742 | 1/1991 | Moon et al. | 522/79 |
| 5,013,784 | 5/1991 | Yang | 524/458 |
| 5,028,484 | 7/1991 | Martin et al. | 428/352 |
| 5,095,065 | 3/1992 | Yang | 524/458 |
| 5,106,902 | 4/1992 | Yang | 524/458 |
| 5,130,375 | 7/1992 | Bernard et al. | 525/278 |
| 5,164,441 | 11/1992 | Yang | 524/458 |
| 5,171,793 | 12/1992 | Johnson et al. | |

FOREIGN PATENT DOCUMENTS

| | | |
|---|---|---|
| 0 196 844 | 10/1986 | European Pat. Off. . |
| 0 286 420 | 10/1988 | European Pat. Off. . |
| 0 303 430 | 2/1989 | European Pat. Off. . |
| 0 342 808 | 11/1989 | European Pat. Off. . |
| 383 497 | 8/1990 | European Pat. Off. . |
| WO 90/15111 | 12/1990 | WIPO . |
| WO 91/07472 | 5/1991 | WIPO . |
| WO 91/18070 | 11/1991 | WIPO . |
| WO 93/19097 | 9/1993 | WIPO . |
| WO 94/137750 | 6/1994 | WIPO . |
| WO 95/12623 | 5/1995 | WIPO . |
| WO 95/13331 | 5/1995 | WIPO . |
| WO 96/05248 | 2/1996 | WIPO . |

OTHER PUBLICATIONS

Fedors, Robert F., "A Method for Estimating Both the Solubility Parameters and Molar Volumes of Liquids", *Polymer Engineering and Science*, Feb., 1974, vol. 14, No. 2, pp. 147–154.

*Primary Examiner*—Kathleen Choi
*Attorney, Agent, or Firm*—Gary L. Griswold; Walter N. Kim; Scott A. Bardell

[57] ABSTRACT

The invention provides a clear and essentially colorless adhesive comprising (A) the polymerization reaction product of starting materials comprising: (a) 25 to 95 parts by weight of a polymerizable component comprising at least one acrylic or methacrylic ester of a non-tertiary alkyl alcohol in which the alkyl group contains 4 to 20 carbon atoms; (b) at least 5 parts by weight of at least one copolymerizable polar comohomer having a strong hydrogen bonding capability selected from an acid, an amide, an anhydride, or a lactam, the sum of (a) and (b) amounting to 100 parts by weight; and (B) 1 to 75 parts by weight, per 100 parts by weight of the sum of components (a) and (b), of a tackifier; said tackifier comprising a water white, hydrogenated resin produced from a hydrocarbon feedstock containing at least 50 percent vinyl aromatic monomer and from 0 to 40 percent by weight of olefin chain transfer agents, said tackifier having: (i) a retained aromaticity on a weight percent of monomers in the feedstock basis of 80 to 95 percent; (ii) a softening point of 65° to 120° C.; (iii) a Mz of less than 1800; (iv) no molecular weight fractions above 7000; and (v) a polydispersity of less than 2.5, wherein said starting materials (a) and (b) are substantially solvent free.

27 Claims, No Drawings

TACKIFIED ACRYLIC ADHESIVES

FIELD OF THE INVENTION

The invention relates to tackified acrylic adhesives and tackified pressure-sensitive acrylic adhesives.

BACKGROUND OF THE INVENTION

Acrylic adhesives, including hot melt adhesives, heat activatable adhesives, and pressure-sensitive adhesives are well known in the art for bonding to a variety of substrates such as metals, painted surfaces, plastics, and the like. Acrylic adhesives, and particularly pressure-sensitive acrylic adhesives, are known for their clarity and excellent aging properties. The preparation of acrylic pressure-sensitive adhesives is taught in a number of sources including, for example, U.S. Pat. Nos. Re 24,906 (Ulrich), 4,181,752 (Martens et al), 4,952,650 (Young et al.), and 4,569,960 (Blake). In spite of the versatility of acrylic adhesives, there are certain substrates, such as certain types of automotive paints and low energy olefinic surfaces, to which typical acrylic adhesives do not adhere well. Efforts have been made to improve the adhesion of acrylic adhesives, i.e., develop more aggressive tack, to these types of surfaces; tackifying the base acrylic polymer is commonly practiced. Various types of tackifying resins include phenol modified terpenes, hydrocarbon resins such as poly-vinyl cyclohexane and poly(t-butyl styrene), and rosin esters such as glycerol esters of rosin and pentaerythritol esters of rosin.

Due to the high solubility parameter of most pressure-sensitive acrylic adhesives and the presence of specific potential interactions between these adhesives and many tackifying resins, a limited selection of tackifying resins is available to the formulator. As a class, hydrocarbon-based tackifying resins, and especially hydrogenated hydrocarbon resins, are typically unsuitable for use in polar acrylic adhesives formulations due to their nonpolar character.

Rosin acid based tackifying resins and selected phenol-modified terpene and alpha-pinene based resins perform well in a variety of acrylic pressure-sensitive adhesives. However, some problems are still associated with the use of this limited range of tackifying resins in acrylic adhesives. Tackified acrylic pressure-sensitive adhesive formulations are often discolored or yellow. The yellow appearance of these tackified acrylic pressure-sensitive adhesives is a direct result of the distinct yellow tinge inherent in many of these tackifying resins. Upon aging and exposure to light, this discoloration can become even more pronounced, even with lighter colored grades of resin. Acrylic adhesives without tackifiers typically have excellent aging properties.

Tackified acrylic pressure-sensitive adhesives can also appear cloudy, demonstrating a loss in the characteristic transparency found in many acrylate pressure-sensitive adhesive compositions. The cloudiness is an indication of limited or incomplete compatibility of the tackifying resin and the acrylic polymers. The reduced compatibility can lead to a degradation of adhesive properties on aging, as evidenced by a loss of tack or reduced peel adhesion. In some cases, the addition of a tackifying resin to an adhesive composition having acrylic monomers, polymers, oligomers, and any mixture thereof, can be clear and appear to be compatible. However, after removing the solvent, curing the adhesive, or on aging, the adhesive can become cloudy, indicating some incompatibility between the tackifier and acrylic base polymer.

In addition to these losses in clarity and stability of tackified acrylic adhesives, other deleterious effects can be observed when tackifying resins are present during bulk acrylic polymerization reactions. Depending on the structure of the tackifying resin, undesirable effects of adding a tackifying resin include the inhibition or retardation of the polymerization reaction and/or the alteration of the final polymer structure if the tackifying resin acts as a chain-transfer or chain-terminating agent. Such effects can adversely influence the performance and stability of acrylates polymerized in the presence of these tackifying resins. Chain termination can also result in undesirably high residual volatile materials.

U.S. Pat. Nos. 4,243,500 and 4,311,759 (Glennon) describe a tackified pressure-sensitive adhesive comprising mono-functional acrylates, an essentially saturated tackifying resin dissolved in the monomer, a non-crystallizing elastomeric material, and an initiator responsive to irradiation.

U.S. Pat. No. 5,028,484 (Martin et at.) discloses the use of 5 to 50 parts ofa poly(t-butyl) styrene tacking resin in photopolymerized acrylates. The acrylates have 4 to 12 carbon atoms in the alkyl group and can be copolymerized with 0 to 15 parts of a polar monomer or 0 to 30 parts of a moderately polar monomer.

U.S. Pat. No. 4,988,742 (Moon et at.) discloses the use of a hydrogenareal rosin ester taekifying resin to tackify an acrylic terpolymer. U.S. Pat. No. 4,726,982 (Traynor et at.) discloses a tackified crosslinked acrylic copolymer of an acrylic add ester and an N-vinyl tactam. EP Patent Appl. 0-342,808 describes an acrylic polymer tackified with a hydrogenated rosin ester.

U.S. Pat. No. 5,130,375 (Bernard et al.) describes the use of reactive rosin-based tackifiers to modify the properties of acrylic pressure-sensitive adhesives, resulting in adhesives with improved high temperature performance and peel adhesion. Upon radiation curing, the tackifier crosslinks or grafts with the polymeric backbone.

EP Patent Appl. 196,844 (Jacob et at.) discloses the use of a tackifier emulsion to tackify acrylic latices. The tackifiers are predominantly C-5 or (C-5)$_2$ combined with 10 to 60 weight percent of an aromatic monomer.

EP Patent Appl. 383,497 (Yeadon et at.) describes the use of non-hydrogenated hydrocarbon resins with a $M_w$ below 2,000 and an aromatic content of 35 to 85 percent for the tackification of acrylic polymers containing at least 40 weight percent butyl acrylate. The compatibility of the resins was judged by clarity of the fresh, dried coating.

U.S. Pat. Nos. 5,013,784, 5,095,065, and 5,164,441, and PCT Patent Appls. WO 90/15111 and WO 91/18070 (all assigned to Exxon) describe the compositions and processes to make tatkilled acrylic copolymer latices with enhanced peel strength and high cohesiveness. In these process descriptions, the tackifier is dissolved in the monomers and is present during the polymerization reaction. The tackifiers are defined as hydrogenated resins, either hydrocarbon, rosin, or polyterpene. Solubility in the monomers at ambient temperature is used as a criterion to select tackifiers, but no mention is made regarding the compatibility of the tackifier in the finished polymer. The hydrocarbons are defined as resins having an average molecular weight from about 500 to about 5,000 and an aromatic content of at least 10 percent by weight. Peel and shear tests are run shortly after drying and no long-term aging tests, which could reveal tackifier compatibility tendencies, are disclosed. Also, no clarity requirements are set for the dried adhesive, i.e., a tacky, but hazy adhesive would still be acceptable.

An ongoing need exists for a clear, tackified, acrylic adhesive composition that has excellent aging and light stability properties.

A need further exists for a stable, clear, tackified adhesive composition comprising a polar acrylic adhesive and a hydrogenated hydrocarbon tackifying resin which resists the immiscibility typical of such mixtures.

A need further exists for a tackified acrylic adhesive composition in which the tackifying resin does not interfere substantially with the bulk polymerization, particularly the radiation polymerization, of (meth)acrylate and other free radically polymerizable monomers.

SUMMARY OF THE INVENTION

The invention provides an adhesive comprising (A) the polymerization reaction product of starting materials comprising:

(a) 25 to 100 parts by weight of a polymerizable component comprising at least one acrylic or methacrylic ester of a non-tertiary alkyl alcohol in which the alkyl group contains 4 to 20 carbon atoms; and (b) 0 to 75 parts by weight of a polymerizable component comprising at least one reinforcing monomer, copolymerizable with component (a), the sum of (a) and (b) amounting to 100 parts by weight; and (B) 1 to 75 parts by weight, per 100 parts by weight of the sum of components (a) and (b), of a tackifier. Component (B) may or may not be present in said starting materials. The tackifier comprises a water white, hydrogenated resin produced from a hydrocarbon feedstock; this tackifier has (i) a retained aromaticity on a weight percent of monomers in the feedstock basis of greater than 50 percent;

(ii) a softening point of 65° to 120° C.;

(iii) a Mz of less than 1800; and (iv) substantially no molecular weight fractions above 7000.

Additional features and advantages of the invention will be set forth in the description which follows, and in part will be apparent from the description, or may be learned by practice of the invention. The objectives and other advantages of the invention will be realized and attained by the methods and articles particularly pointed out in the written description and claims hereof.

It is to be understood that both the foregoing general description and the following detailed description are exemplary and explanatory and are intended to provide further explanation of the invention as claimed.

DETAILED DESCRIPTION OF THE INVENTION

Adhesives of the present invention are acrylic polymers that are tackified with a water white, hydrogenated, aromatic hydrocarbon tackifying resin having a retained aromaticity greater than 50 percent, preferably greater than 70 percent, and more preferably greater than 80 percent, based on the amount of monomer in the feedstock. A preferred range for retained aromaticity is 70 to 95 percent, more preferably 80 to 95 percent.

The useful tackifying resins have a Z-average molecular weight ranging from about 500 to 1800, preferably between about 600 and 1500, and most preferably from about 650 to 1200. In a highly preferred embodiment of the invention, the tackifying resin has a Z-average molecular weight between about 700 and 1100. The Z-average molecular weight is further preferred to be less than 1500, more preferably less than 1200, and more preferably less than 1000.

The useful tackifying resins also have a narrow molecular weight distribution with a polydispersity (Mw/Mn) ofless than 2.5, preferably less than about 2.1, and most preferably less than 1.9. The molecular weight characterizations are determined by gel permeation chromatography using a polystyrene calibration basis and then converting to a polyisobutylene calibration basis according to the following equation:

$$\log (Mw_{polyisobutylene}) = 1.1 \times \log (Mw_{polystyrene}) - 0.517 \quad (1)$$

The procedure is described in detail in WO-A-91-07472 (Luvinh), which is hereby incorporated by reference.

The softening points (Ring and Ball softening points as determined by ASTM E-28) of these tackifying resins typically fall within the range of about 40° C. to about 120° C., and preferably from about 65° C. to about 100° C.

The resins, after hydrogenation, are water white. A "water white" resin is defined to be a resin having a molten Gardner color of less than about 2. An especially preferred resin has a molten Gardner color of less than 1.

The resin also preferably exhibits an initial color after hydrogenation of greater than 24 Saybolt (10% solution) in toluene.

The useful tackifying resins are hydrogenated petroleum hydrocarbon resins that may be produced by catalytic polymerization of principally aromatic monomers. After polymerization and hydrogenation, these aromatic monomers retain at least 20% aromatic protons as determined by nuclear magnetic resonance (NMR), and preferably at least 24% aromatic protons. The aromaticity is measured by proton NMR ($^1$H-NMR) analysis by generally accepted procedures. The "retained aromaticity" is the ratio of the aromaticity by proton NMR of the hydrogenated resin to that of the polymerized resin prior to hydrogenation. The procedure is described in detail in WO-A-91-07472 (Luvinh).

The tackifying resins can be prepared by the following procedure:

(a) polymerizing under Friedel-Crafts polymerization conditions steam cracked distillates, or fractions thereof, having boiling points between about 135° C. and 220° C., and containing at least 40% by weight vinyl aromatic monomer contents, in the presence of 0 to 40% by weight of the polymerization mixture of a chain transfer agent; and (b) catalytically hydrogenating the results of (a) such that at least 75% of the aromaticity is retained.

The tackifying resins are preferably prepared by catalytic polymerization of petroleum fractions identified as Heartcut Distillates, or HCD, and 0 to 40% by weight of a chain transfer agent. The resins are typically prepared from vinyl aromatic streams comprising the following components:

| Components | Typical Range | Typical Heartcut Distillate |
|---|---|---|
| Styrene | 1–15 | 8 |
| Alkyl derivatives of styrene | 15–40 | 25 |
| Indene | 5–20 | 10 |
| Alkyl derivatives of indene | 3–15 | 10 |
| Non-reactive components | 15–76 | 47 |

Such streams can be derived from the steam-cracked petroleum distillates or fractions thereof, having boiling points between about 135° C. and 220° C. so long as they contain or are modified to contain sufficient vinyl aromatic contents. For example, an essentially pure styrene component can be added to commercially available petroleum distillate products that fit this description except for styrene. In this manner, a vinyl aromatic stream comprising, by weight percent, 11.4% styrene, 31.6% alkyl derivatives of styrene, 17.1% indene, 5% alkyl derivatives of indene, and 34.9% non-reactive components, was confirmed to be a suitable resin feedstock.

Polymerization of the hydrocarbon resin is generally accomplished according to the teachings of U.S. Pat. No. 4,078,132 (Lepert), incorporated herein by reference. According to this teaching, branched chain aliphatic olefins are introduced during polymerization as chain transfer agents to achieve both lowered softening point and narrowed molecular weight distribution. Although this document addresses the preparation of substantially non-aromatic unsaturated thermoplastic resins, the teaching therein is applicable to feed streams comprising heartcut distillates or feed streams crimprising vinyl aromatic monomer(s) to yield a highly aromatic precursor resin, which when hydrogenated can yield the aromatic tackifier resin described herein. The feed streams should contain at least 40%, by weight of total polymerizable monomers, of vinyl aromatic monomers, and preferably at least 50%.

The polymerization process of U.S. Pat. No. 4,078,132 is particularly suitable when practiced at polymerization temperatures between 20° C. and 100° C., and preferably between 30° C. and 80° C., in the presence of a Friedel-Crafts catalyst such as aluminum chloride ($AlCl_3$) and in the presence of the branched chain reactive olefin chain transfer agents, which are preferably isoamylenes, dimates, or mixtures thereof. Most of the branched chain reactive olefin compounds will be effective when used in the proper mounts as described in U.S. Pat. No. 4,078,132. Some compounds, such as isoamylenes, are more reactive and can be advantageously used in smaller amounts to control the softening point and molecular weight distribution. Useful amounts of the reactive chain transfer agents are typically in the range of 10 to 20% by weight based on the total weight of the heartcut distillate or vinyl aromatic feed stream, and preferably in the range of 10 to 15%. The process conditions described in U.S. Pat. No. 4,514,554 (Hughes et al.), incorporated herein by reference, also include a description of the polymerization of petroleum fraction feedstocks including isoamylenes.

Hydrogenation can generally be accomplished according to the teachings in U.S. Pat. No. 4,629,766 (Malatesta et al.), incorporated herein by reference, but other conventional means of hydrogenation may also be used. Typically, temperatures of 200° C. to 300° C. are used at pressures of 10 to 300 kg/cm$^2$, and hydrogenating or hydrotreating catalysts such as Group VIII metals such as nickel, palladium, cobalt, ruthenium, platinum, and rhodium, Group VI metals such as tungsten, chromium and molybdenum, and Group VII metals such as manganese and copper, are used. These metals may be used alone or in a combination of two or more metals, in the metallic form, or in an activated form, and may be used directly or on a solid support such as alumina or silica-alumina. A preferred catalyst is one comprising sulfided nickel-tungsten on a gamma-alumina support having a fresh catalyst surface area ranging from 120 to 300 meters$^2$/gram, and containing 2 to 10% by weight nickel and 10 to 25% by weight tungsten as described in U.S. Pat. No. 4,629,766. The hydrogenation is typically carried out with a hydrogen pressure of 20 to 300 atmospheres ($2.03 \times 10^5$ to $3.09 \times 10^7$ Newtons per square meter), and preferably 150 to 250 atmospheres ($1.52 \times 10^7$ to $2.53 \times 10^7$ Newtons per square meter). Additional description of hydrogenation of aromatic resins is described in U.S. Pat. No. 3,926,878 and WO-A-91/07472.

Hydrogenation is preferably performed at temperatures, pressures, and times with the effective catalysts so as to retain at least 75% aromaticity, preferably at least 80%, more preferably at least 85%, and most preferably, at least 90%. Optimization of the hydrogenation process can be empirically accomplished according to the above described process.

The adhesives of the invention are prepared from starting materials comprising from about 25 to 100 parts by weight of at least one alkyl acrylate monomer, and from about 0 to 75 parts by weight of a reinforcing co-monomer.

Acrylate monomers useful in the practice of the invention are those which have a homopolymer glass transition temperature less than about 0° C., and preferably less than about 20° C. Useful alkyl acrylate monomers are monofunctional (meth)acrylic acid esters of non-tertiary alkyl alcohols having from 4 to 20 carbon atoms in the alkyl moiety, preferably from 4 to 18 carbon atoms, and most preferably from 4 to 14 carbon atoms. Examples of useful alkyl acrylate monomers include, but are not limited to, n-butyl acrylate, n-hexyl acrylate, n-octyl acrylate, isooctyl acrylate, 2-ethylhexyl acrylate, isononyl acrylate, n-decyl acrylate, n-dodecyl acrylate, and mixtures thereof.

Preferably, a monoethylenically unsaturated reinforcing co-monomer having a homopolymer glass transition temperature (Tg) greater than about 15° C., preferably greater than 25° C., is co-polymerized with the acrylate monomers. Examples of useful co-polymerizable monomers include, but are not limited to, meth(acrylic) acid, itaconic acid, N-vinyl pyrrolidone, N-vinyl caprolactam, substituted (meth)acrylamides, such as N,N,-dimethyl acrylamides, acrylonitrile, 2-carboxyethyl acrylate, maleic anhydride, and mixtures thereof. Other suitable polar monomers include monofunctional unsaturated monomers wherein the relative amount of ester group to hydrocarbon of the alkyl substituents is high and the monomers have a higher solubility parameter than the higher alkyl substituted acrylates and vinyl esters. Examples of such monomers are methylacrylate, ethylacrylate, methylmethacrylate, ethyl methacrylate, vinyl acetate, vinyl propionate, and the like. Nonpolar monomers such as isobornyl acrylate may also be used.

When a reinforcing co-monomer is used, the alkyl acrylate is present in the composition in amounts from about 25 to 99 parts by weight and the reinforcing co-monomer is present in amounts from 1 to 75 parts by weight, wherein the total mount by weight is 100. The useful amounts of each type of monomer will vary depending upon the desired properties of the adhesive. Higher amounts, e.g., from about 40 to 75 parts by weight of the monomers having a $T_g$ above 15° C. will provide heat activatable adhesive compositions, while lower amounts, e.g., less than about 40 parts by weight can provide pressure-sensitive adhesive compositions.

Generally, it is preferred that the starting materials comprise at least 2 parts by weight of co-monomer, per 100 parts by weight of monomer and co-monomer, more preferred is at least 5 parts by weight of co-monomer. For pressure-sensitive adhesives, a preferred range for the co-monomer is from about 1 to about 30 parts by weight per 100 parts of monomer and co-monomer. For pressure-sensitive adhesives in which the co-monomer is acrylic acid or methacrylic acid, a preferred range is 1 to 15 parts by weight per 100 parts of monomer and co-monomer.

As used herein, the word copolymer is intended to include terpolymers, tetrapolymers, and the like. Polar co-monomers include monomers having strong hydrogen bonding capabilities such as acids, amides, anhydrides, lactams, nitriles, and moderately polar co-monomers such as lower alkyl (1 to 3 carbon atoms) acrylates and lower alkyl (1 to 3 carbon atoms) vinyl esters.

The hydrocarbon resin can be used in amounts of from about 1 to 75 pph (parts by weight per 100 parts of the alkyl acrylate monomer and any optional co-monomer(s)). Typically, the hydrocarbon resin is present in the adhesive in amounts from about 2 to 50 pph. Preferably, the hydrocarbon resin is present in amounts from about 3 to 45 pph, and most preferably from about 5 to about 30 pph.

In the practice of the invention, the tackifying resin is particularly useful in combination with acrylic adhesives wherein the adhesive is a copolymer of at least one alkyl acrylate monomer and a polar co-monomer. In general, the addition of a co-monomer having a higher homopolymer glass transition temperature, and in particular, a polar co-monomer such as acrylic acid, will result in increased cohesiveness of the adhesive which will in turn exhibit increased shear strength. Commercially available hydrogenated hydrocarbon tackifying resins are often not compatible with polar monomers or acrylic polymers having hydrogen bonding polar monomers, and such tackified adhesives usually have low shear strength and exhibit decreased adhesion to the substrate as the adhesive ages over a period of time. The adhesives of the present invention preferably are clear and essentially colorless.

In the practice of the invention, the acrylic polymers can be polymerized by techniques including, but not limited to, the conventional techniques of emulsion polymerization, solvent polymerization, bulk polymerization, and radiation polymerization, including processes using ultraviolet light, electron beam, and gamma radiation. The starting materials may comprise a polymerization initiator, especially a thermal initiator or a photoinitiator of a type and in an amount effective to polymerize the polymerizable components (a) and (b).

Solvent polymerization is well known in the art and described in various sources such as U.S. Pat. Nos. Re 24,906 (Ulrich), and 4,554,324 (Husman et al.). Briefly, the procedure is carried out by adding the monomers, a suitable solvent such as ethyl acetate, and an optional chain transfer agent to a reaction vessel, adding a free radical initiator, purging with nitrogen, and maintaining the reaction vessel at an elevated temperature, typically in the range of about 40° to 100° C. until the reaction is completed, typically in about 1 to 20 hours, depending upon the batch size and temperature. Suitable free radical initiators are commercially available such as those available from DuPont Company under the VAZO trade designation. Specific examples include Vazo™64 (2,2'-azobis(isobutyroniltrile) and Vazo™52. Suitable initiators also include hydroperoxides, such as tert-butyl hydroperoxide, and peroxides, such as benzoyl peroxide and cyclohexane peroxide. The hydrocarbon resin can be added either to the monomers before polymerization, or it can be added to the adhesive mixture after polymerization.

Emulsion polymerization is also described in U.S. Pat. No. Re 24,906 in which the monomers are added to distilled water with an emulsifying agent and suitable initiators in a reaction vessel, purged with nitrogen, and heated, typically to a temperature in the range of about 25° to 80° C., until the reaction is completed. Again, the hydrocarbon resin can be added either to the monomers before polymerization, or it can be added to the adhesive mixture after polymerization.

The adhesives of the invention can also be prepared by bulk polymerization methods in which the adhesive composition comprising the monomers, the tackifying resin, and a free radical initiator is coated onto a flat substrate such as a polymeric film and exposed to an energy source in a low oxygen atmosphere, i.e., less than 1000 parts per million (ppm), and preferably less than 500 ppm, until the polymerization is substantially complete, i.e., residual monomers are less than 10%, and preferably less than 5%.

Alternatively, a sufficiently oxygen free atmosphere can be provided by enclosing the composition with, for example, a polymeric film. In one embodiment, the film can be overlaid on top of the coated adhesive composition before polymerization. In another embodiment, the adhesive composition is placed in pouches, which can be optionally sealed, and then exposed to energy, such as heat or ultraviolet radiation to form the adhesive. The adhesive can then either be dispensed from the pouches for use, or the pouches can be fed to a hot melt coater and coated onto a substrate to make tapes or other types of adhesive coated substrates. In the latter case, the pouch material should be hot melt coatable with the adhesive in the pouch, and the pouch material does not deleteriously affect the desked end properties of the adhesive.

Preferably, the adhesive composition is substantially solvent free. As used herein, "substantially solvent free" refers to an adhesive that has been prepared without the use of large amounts of solvent, i.e., less than 5% by weight of a coating composition, preferably less than about 2%, and more preferably no additional solvent is added. The preparation of the adhesive includes processes used in the polymerization of the monomers used as the adhesive as well as processes in the coating process to make finished articles, e.g., tapes made with the adhesive. The term "solvent" refers both to water and to conventional organic solvents used in the industry which are volatilized in the process. These organic solvents include, for example, toluene, heptane, ethyl acetate, methyl ethyl ketone, acetone, and mixtures thereof.

Other polymerization methods, such as the continuous free radical polymerization method described in U.S. Pat. Nos. 4,619,979 (Kotnour et at.) and 4,843,134 (Kotnour et al.), both incorporated herein by reference, may also be utilized to prepare adhesives of the invention.

The adhesives of the invention can be formulated to be hot melt adhesives and/or heat activated adhesives by any of the above-mentioned polymerizing methods. Heat activated adhesives are those that are substantially non-tacky at room temperature but become tacky upon heating.

In a preferred practice of the invention, the hydrocarbon tackifying resin is dissolved in the acrylate monomers or an acrylic syrup. As used herein a syrup refers to a mixture that has been thickened to a coatable viscosity, i.e., preferably between about 300 and 10,000 centipoise or higher depending upon the coating method used, and include mixtures in which the monomers are partially polymerized to form the syrup, and monomeric mixtures which have been thickened with fillers such as silicas and the like. Preferably, the syrups of the invention are formed by partial polymerization of the monomers by free radical initiators which are known in the art and can be activated by thermal energy or radiation such as ultraviolet light. In some instances, it may be preferred to add additional monomer to the syrup, as well as further photoinitiator and other adjuvants. An effective amount of at least one free radical initiator is added to the acrylate monomers or syrup. The mixture is then coated onto a substrate such as a transparent polyester film, which may optionally be coated with a release coating, and exposed to ultraviolet radiation in a nitrogen rich atmosphere to form a pressure-sensitive adhesive. Alternatively, oxygen can be excluded by overlaying the coated adhesive with a second release coated polyester film. Preferably the ultraviolet radiation is provided by ultraviolet lamps having a majority of their emission spectra between about 280 and 400 nanometers (nm) with a peak at about 350 nm and an intensity less than about 20 milliWatts/square centimeter (mW/sq cm). Subsequent exposure of the adhesive to a second source of energy can be used to cross-link or further cure the adhesive. Such sources of energy include heat, electron beam, gamma radiation, and high intensity ultraviolet lamps, such as mercury arc lamps. The adhesive compositions of the invention are particularly suitable for polymerization by ultraviolet radiation because the useful hydrocarbon tackifying resin does not phase separate after it has been incorporated into the composition, as would be evidenced by haziness or opacity in the adhesive, and it does not impart colors such as yellow which may inhibit (i.e., completely stop) or retard the polymerization process and result in an undesirably high residual monomer/volatile oligomer content.

In an alternative embodiment, the adhesive composition uses a thermally activated initiator. The compostion can be coated onto a release treated film, covered with a second release treated film, and the composite is placed in a heat transfer fluid and heated to a temperature sufficient to effect polymerization.

Useful free radical initiators include thermal and photoactive initiators. Examples of useful thermal free radical initiators include those described above for solvent polymerization. In a preferred embodiment, the initiator is a photoinitiator and includes, but is not limited to, substituted acetophenones such as 2,2-dimethoxy-2-2-phenylacetophenone, benzoin ethers such as benzoin methyl ether, substituted benzoin ethers such as anisoin methyl ether, and substituted alpha-ketols such as 2-methyl-2-hydroxypropiophenone. Also useful are copolymedc photoinitiators. The photoinitiators can be used in amounts from about 0.001 part by weight per 100 parts of the monomer and optional co-monomer (pph) to about 5 pph depending upon the type and molecular weight of the photoinitiator. Preferred amounts range from about 0.1 pph to about 1 pph.

The pressure sensitive adhesives can also be cross-linked to provide greater shear strength. For radiation curing, useful cross-linking agents include multifunctional acrylates, such as those disclosed in U.S. Pat. No. 4,379,201 (Heilman), which include but are not limited to 1,6-hexanediol diacrylate, trimethylolpropane triacrylate, 1,2-ethylene glycol diacrylate, pentaerythritol tetracrylate, and mixtures thereof, photoactive triazines such as those disclosed in U.S. Pat. Nos. 4,329,384 (Vesley et al.), 4,330,590 (Vesley), and 4,391,687 (Vesley), co-polymerizable aromatic ketone comonomers such as those disclosed in U.S. Pat. No 4,737,559 (Kellen et al.), organosilanes, benzophenones, isocyanates, and bisamides.

The cross-linking agents are generally included in amounts from about 0.002 pph to about 5 pph, and preferably from about 0.01 pph to about 0.5 pph. The amount used will depend upon the amount of functionality and molecular weight of the cross-linking agent, and the desired properties of the adhesive.

Physical crosslinking agents such as copolymerizable macromonomers disclosed in U.S. Pat. No. 4,554,324 (Husman et al.), incorporated herein by reference, can be used. Useful amounts of macromonomers range from about 1 pph to 20 pph, and preferably from 2 pph to 10 pph.

Other adjuvants can be included in the composition in amounts needed to effect the desired properties as long as they do not affect the desired end properties of the adhesive. Useful adjuvants include dyes, pigments, silica, hydrophobic silica, cellulose, fibers, glass or polymeric beads, polymeric particles, electrically or thermally conductive particles.

The pressure-sensitive adhesives can be supplied as transfer tapes in which the adhesive mass is provided in strip form on a release liner, a double coated tape in which a carrier layer is interposed between two layers of adhesive, or as a pressure sensitive adhesive tape in which the adhesive is provided on a permanent backing. Release liners include, for example, paper, polymeric films, woven or nonwoven fabrics which have been treated on at least one major surface, and preferably on both major surfaces, with a release agent such as silicone, perfluoropolyether, TEFLON™, and the like. Permanent tape backings include, but are not limited to paper, foamed sheets such as acrylic foams, polyethylene foams, urethane foams, polymeric films and sheets, metal foils, and woven and nonwoven fabrics. Carrier layers for double coated tapes include those useful for permanent tape backings and may have different adhesives on each side of the tape. For example, a pressure-sensitive adhesive of the invention is disposed on one side of the carrier layer, and a second adhesive is disposed on the other side of the carrier layer. The second adhesive may be the same or a different type of pressure-sensitive, e.g., acrylic, synthetic rubber, natural rubber, or silicone pressure-sensitive adhesive, a hot melt or a thermosettable adhesive. The tapes of the invention can be prepared by laminating an adhesive transfer tape to the backing or carrier, or the adhesive composition can be coated onto the carrier's backing and cured in situ.

Where a foam-like pressure-sensitive adhesive tape is desired, the monomers or syrup may include microspheres. Useful microspheres can have a size ranging from about 5 to 200 micrometers in diameter, and preferably from about 10 to 80 micrometers. Suitable commercially available microspheres include expandable microspheres sold under the trade name "Expancel" from Kema Nord Plastics and those sold under the trade name "Micropearl" from Matsumoto Yushi Seiyaku. The microspheres expand upon heating and can be incorporated into the adhesive composition in the expanded form, or added in unexpanded form to the adhesive composition and subsequently heated, provide a foam-like tape. Glass or ceramic microspheres can also be used. Useful amounts of microspheres range from about 2% to about 75% by volume of the pressure-sensitive adhesive composition.

A foam-like tape can also be provided by frothing the pressure-sensitive adhesive composition as taught in U.S. Pat. No. 4,415,615 (Esmay et at.), incorporated herein by reference.

Alternatively, tapes using the pressure-sensitive adhesives of the invention can also be formed into multiple layer tapes by methods such as those disclosed in U.S. Pat. Nos. 4,894,259 (Kuller), 4,818.610 (Zimmerman et al.), and 4,895,738 (Zimmerman et al.).

The adhesives of the invention are useful for adhering well to a variety of different surfaces including low energy surfaces such as thermoplastic olefins, thermoplastic urethanes, ethylene propylene diene monomer rubbers, weatherstripping, automotive body side moldings, automotive paint surfaces, other plastic surfaces, and metals. The adhesives can also be applied to substrates to make labels, medical adhesive tapes, decorative tapes, surgical drapes, and the like.

The adhesives of the invention are particularly useful on automotive paints as indicated by 90° peel adhesion of at least 11 N/dm after aging for three days at room temperature.

The following non-limiting examples serve to further illustrate the present invention in greater detail.

Test Methods

Static Shear Strength Test 1

A 1.27 cm by 2.54 cm strip of pressure-sensitive tape is laminated to a 20 mil (0.51 mm) thick anodized aluminum panel measuring about 2.54 cm by 5.08 cm. A second panel of the same size is placed over the tape so that there is a 2.54 cm overlap, and the ends of the panels extend oppositely from each other. The sample is then rolled down with a 6.8 kg steel roller so that the total contact area of the sample to panel was 1.27 cm by 2.54 cm. The substrates used for the second panel were either stainless steel (SS), or a painted panel indicating the paint type as described below in the peel adhesion test. The prepared panel is allowed to dwell at room temperature, i.e., about 21° C. for at least 1 hour. The panel is then placed in a 70° C. oven and positioned 2° from the vertical to prevent a peel mode failure, and a 500 gram weight is hung on the free end of the sample. The time required for the weighted sample to fall off of the panel is recorded in minutes. If no failure has occurred within 10,000 minutes, the test is discontinued and results are recorded as 10,000+minutes.

Static Shear Strength Test 2

This test was conducted in accordance with ASTM D3654M-88. A 1.27 cm wide and about 6 cm long test sample is applied to a stainless steel test panel with minimal pressure and about 2 cm overlap with the test panel. The free-end of the tape is temporarily supported by a release surface. The sample is rolled down with six passes of a 2 kg hard rubber covered steel roller and the sample is trimmed to provide a 12.7mm×12.7mm overlap with the stainless panel. The stainless panel is then mounted in a test stand at an angle of about 2° from vertical (this to prevent the adhesive tape from being peeled from the stainless panel) and 1 kg load is applied to the free end of the tape. The time to failure is reported in minutes. After 10,000 minutes the test is discontinued. If failure occurs sooner, the adhesive failure mode is recorded.

90° Peel Adhesion

The pressure-sensitive adhesive sheet is laminated to a sheet of 5 mil (0.127 mm) thick anodized aluminum. A strip of tape measuring 1.27 cm by 11.4 cm is cut from the sheet and applied to a metal substrate that was painted with one of the following basecoat/clear coat automotive paint compositions:

RK-8010, available from DuPont Co.
E-176, available from BASF
UCC-1000, available from PPG Industries
RK-3939, available from DuPont Co.
RK-8004, available from DuPont Co.

The strip is then rolled down using four total passes of using a 6.8 kg hard rubber roller. Before testing, the sample is aged under the following conditions:

A—5 seconds at room temperature
B—20 minutes at room temperature
C—3 days at room temperature
D—5 days at 70° C.

After aging, the panel is mounted in an Instron™ Tensile Tester so that the tape is pulled off at a 90° angle at a speed of 30.5 cm per minute and at 1.27 cm per minute. Results are determined in pounds per 0.5 inch, and converted to Newtons per decimeter (N/dm). 180° Peel Adhesion This test was conducted in accordance with ASTM D3330-87. A strip of tape 1.27 cm wide and about 20 cm long is adhered at one end of the test panel. The other end is held such that the strip does not touch the test panel. The strip is then rolled down with a 2 kg hard rubber covered steel roller and allowed to dwell for varying lengths of time. The test panels used and dwell times are specified in each example. The free end of the tape is then double backed and the 180° peel is measured at a 30 cm min$^{-1}$ peel back rate from a polypropylene surface or 228 cm min$^{-1}$ peel back rate from a glass surface. The peel force is then recorded. Unless otherwise noted, all failure modes are adhesive from the test substrate.

HYDROCARBON RESIN

The aromatic hydrocarbon tackifying resin used in these examples was prepared according to the above disclosure, and is characterized by the properties shown in Table 2.

TABLE 2

| Hydrocarbon Resin Properties | |
|---|---|
| Softening Point | 98° C. |
| Gel Permeation Chromatography Molecular Weight | |
| Mw (Weight Average) | 520 |
| Mn (Number Average) | 330 |
| Mw/Mn (Polydispersity) | 1.6 |
| Mz (Z-average) | 900 |
| Aromaticity$^{(1)}$, % | 27 |
| Glass Transition Temperature (DSC midpoint) | 51° C. |
| Saybolt Color (10% solution in toluene) | 28 |
| Aged Gardener Color (50% solution in solvent), 5 hrs at 175° C. | 5 |
| Molten Gardner Color | <1 |
| Wax Cloud Point$^{(2)}$ | 70° C. |
| Volatility, weight percent (5 hrs at 175° C.) | 12 |

$^{(1)}$% aromatic protons (about 95% on an aromatic monomer basis)
$^{(2)}$20 Escorene EVA UL7750, 40 resin, 40 paraffin wax (65° MP)

EXAMPLE 1

A pressure-sensitive adhesive composition was prepared by mixing 54 parts isooctyl acrylate (IOA), 36 parts butyl acrylate (BA), 10 parts acrylic acid (AA), and 0.04 part benzil dimethyl ketal photoinitator (Escacure™KB-1 available from Sartomer Co.) in a closed container and purging with nitrogen. As the nitrogen purging continued, the composition was irradiated with an ultraviolet black light (GE F15T8 BL from General Electric Co.) which was partially taped with black tape to provide an intensity of about 0.15 milliwatts per square centimeter (mW/cm$^2$), measured according to the industry standard G unit, to form a syrup having a coatable viscosity estimated to be about 3000 centipoise. To the syrup was added an additional 0.16 part benzil dimethyl ketal, 0.15 part 2,4-bis(trichloromethyl)-6-(4-methoxyphenyl)-s-triazine, 20 parts hydrocarbon resin (described above), and 0.06 part 1,6-hexanedioldiacrylate. After mixing, the mixture was knife coated to a thickness of about 0.076 millimeters on a transparent polyester film that had been coated with a silicone release coating, and then exposed to fluorescent black lamps having 90% of the emission spectra between 300 and 400 nm with a maximum at about 350 nm in a nitrogen inerted chamber (50 ppm oxygen). This process results in a pressure-sensitive adhesive transfer tape. Lamps were used above and below the coated web and the light intensity was 1.2 mW/cm$^2$ (G units) for 2.2 minutes and increased to 2.2 mW/cm$^2$ for 4.4 minutes.

A foam sheet material was prepared as taught in U.S. Pat. No. 4,415,615 (Esmay et al.) using a mixture of 87.5 parts IOA, 12.5 parts AA, and 0.04 parts benzil dimethyl ketal to make a syrup as described above. To the syrup was added an additional 0.19 part benzil dimethyl ketal, 2.0 part hydrophobic silica (K-972 available from DeGussa), and 8 parts glass microbubbles (C15-250 available from Minnesota Mining & Manufacturing Co.). The composition was frothed with nitrogen and 1-2 pph of a 60/40 mixture of Surfactant B/Surfactant C of U.S. Pat. No. 4,415,615, hereby incorporated by reference. This composition was then coated and cured to form a sheet material. The sheet material was then barrier coated with a 10% solids solution of a polyamide resin (Macromelt 6240 from Henkel, Inc.) in a solvent blend having 50 parts isopropanol and 50 parts n-propanol and dried in a 121° C. oven for 15 minutes. The pressure-sensitive adhesive transfer tape was then heat laminated to the foam sheet material.

The pressure-sensitive adhesive coated foam sheet material was tested according to the above described procedures for 90° Peel Adhesion and results are shown in Table 3. The physical appearance of the pressure-sensitive adhesive is also noted as well as the amount of volatiles (Vol.).

EXAMPLES 2-4

Example 2 was prepared as in Example 1 except that 10 pph of the hydrocarbon resin were used on the adhesive. Examples 3 and 4 were prepared as Examples 1 and 2, respectively, except that the triazine was omitted, and 0.1 pph 1,6-hexanedioldiacrylate and 0.1 pph trimethylolpropanetriacrylate were added. All of the samples were laminated to the foam sheet material of Example 1 and tested.

COMPARATIVE EXAMPLES C1–C7

Comparative Examples C1–C3 were prepared as in Example 1, and C4–C7 were prepared as in Example 3, except that the tackifying resin was either omitted, or a commercially available resin was used as follows:
C1—No tackifying resin
C2—20 parts Regalrez™6108 (available from Hercules, Inc.)
C3—20 parts Regalrez™3102 (available from Hercules, Inc.)
C4—No tackifying resin
C5—20 parts Foral™85 (available from Hercules, Inc.)
C6—20 parts Regairez™6108
C7—20 parts Regairez™3102 exhibit improved peel adhesion to a paint substrate without increasing the amount of volatiles.

EXAMPLE 5

A pressure-sensitive adhesive composition was prepared as in Example 3 (with 20 pph hydrocarbon resin tackifier, described above) except that the monomer composition was 46.25 parts IOA, 46.25 parts BA, and 7.5 parts AA. The adhesive was heat laminated to the foam as described in Example 1, and tested on various automotive paint substrates. Test results are shown in Table 4.

COMPARATIVE EXAMPLE C8

A pressure-sensitive adhesive tape was prepared as in Example 5 except that the 20 parts of hydrocarbon resin were omitted. Test results are shown in Table 4.

TABLE 4

| Test substrate | Test | Example 5 | Example C8 |
|---|---|---|---|
| | Tests on Automotive Paints | | |
| E-176 | 90° Peel Adhesion - N/dm - A | 242 | 84 |
| | 90° Peel Adhesion - N/dm - B | 336 | 133 |
| | 90° Peel Adhesion - N/dm - C | 525 | 216 |
| UCC | 90° Peel Adhesion - N/dm - A | 221 | 95 |
| | 90° Peel Adhesion - N/dm - B | 273 | 133 |
| | 90° Peel Adhesion - N/dm - C | 501 | 221 |
| RK-3939 | 90° Peel Adhesion - N/dm - A | 371 | 154 |
| | 90° Peel Adhesion - N/dm - B | 448 | 224 |
| | 90° Peel Adhesion - N/dm - C | 511 | 529 |
| E-176 | Static Shear - minutes at 158 F. | 10,000+ | 10,000+ |
| SS | Static Shear - minutes at 158 F. | 10,000+ | 10,000+ |
| None | Volatiles - % | 1.19 | 0.8 |

The data in Table 4 show that pressure-sensitive adhesives of the invention exhibit superior build of adhesion to various paint substrates as compared with a composition which does not have the hydrocarbon resin.

EXAMPLE 6

An adhesive composition was prepared by mixing 45 parts of isooctylacrylate (IOA), 10 parts acrylic acid, and

TABLE 3

Test Data

| Ex | Appearance | $^1$Vol. Wt % | $^2$Peel Adhesion - N/dm 30.48 cm/min. | | | | $^2$Peel Adhesion - N/dm 1.27 cm/min. | | | |
|---|---|---|---|---|---|---|---|---|---|---|
| | | | A | B | C | D | A | B | C | D |
| 1 | Clear | 1.6 | 179 | 294 | 396 | 588 | 151 | 203 | 326 | 333 |
| 2 | Clear | 1.1 | 130 | 168 | 214 | 637 | 63 | 91 | 249 | 364 |
| C1 | Clear | 0.5 | 88 | 109 | 158 | 609 | 32 | 39 | 105 | 354 |
| C2 | Opaque/white | 1.2 | 77 | 84 | 193 | 58 | 39 | 39 | 70 | 354 |
| C3 | Opaque/white | 1 | 81 | 116 | 129 | 571 | 46 | 60 | 77 | 354 |
| 3 | Clear | 1.8 | 175 | 186 | 399 | 627 | 15 | 245 | 298 | 371 |
| 4 | Clear | 1.2 | 121 | 175 | 245 | 641 | 67 | 119 | 200 | 364 |
| C4 | Clear | 0.6 | 84 | 112 | 172 | 571 | 35 | 60 | 109 | 326 |
| C5 | Clear/yellow | 3.8 | 210 | 231 | 533 | 574 | 60 | 112 | 294 | 343 |
| C6 | Opaque/white | 1.4 | 77 | 109 | 98 | 606 | 42 | 49 | 105 | 350 |
| C7 | Opaque/white | 1.2 | 88 | 88 | 168 | — | 46 | 60 | 119 | 350 |

$^1$Vol. - Volatile were determined gravimetrically before and after heating for 2 hours at 121° C. and are expressed as a weight percent.
$^2$The paint surface for the Peel Adhesion test was RK-8010.

The data in Table 3 show that ultraviolet radiation cured pressure-sensitive adhesives of the invention are clear and 0.04 pph benzil dimethyl ketal photoinitiator (KB-1 available from Sartomer Co.) in a jar. The jar was purged with nitrogen, and then with continued sparging with nitrogen, the mixture was exposed to black light ultraviolet lamps (GE F-15T8BL available from General Electric Co.) at an intensity according to the industry standard G units of 0.15 milliWatts per square centimeter (mW/sq cm) to form a syrup having a viscosity estimated to be about 3000 centipoise. The following were then added to the syrup: 45 parts butyl acrylate, 0.1 pph 1,6-hexanedioldiacrylate, 0.1 pph triacrylate (OTA-480 obtained from Radcure), 16 pph hydrocarbon tackifier (described above), and an additional 0.16 pph benzil dimethyl ketal photoinitiator, and mixed on a roller mill for about 20 hours until all of the components were dissolved and a clear solution was formed. hst prior to coating, 0.4 pph of a solution of $SnCl_2$/propylene glycol (80/20 by weight) was added and mixed on a roller mill for about 30 minutes. The composition was knife coated to a thickness of about 0.06 millimeters and coated between two transparent polyester films which were coated with a silicone release coating to form a pressure-sensitive adhesive, except that the light intensity profile was as follows: 0.75 $mW/cm^2$ for 2.43 minutes, 1.6 $mW/cm^2$ for 2.43 minutes, 2.8 $mW/cm^2$ for 2.44 minutes. A pressure-sensitive sheet material was prepared and tested as described in Example 1. Volatiles (Vol.) were determined to be less than 2%. Peel adhesion was determined on an RK-8004 paint substrate, and test results are as follows:

| Peel Adhesion @ 30.48 cm/min-N/dm | | | Peel Adhesion @ 1.27 cm/min-N/dm | | |
|---|---|---|---|---|---|
| A | B | C | A | B | C |
| 231 | 368 | 385 | 91 | 270 | 263 |

EXAMPLE 7

A tackified solution adhesive was prepared in the following manner: 178.43 grams ethyl acetate was added to a 1 liter split-resin flask fitted with a condenser, addition funnel, glass stir-rod with half moon polytetrafluoroethylene blade, and a mechanical stirrer. Heating was provided by a mantle connected to a variable voltage source. Also added was 55 grams of an acrylate monomer mixture of 104.5 grams isooctyl acrylate (IOA), 99.0 grams n-butyl acrylate (BA), 16.5 grams acrylic acid (AA), 2.12 grams 4-acryloxybenzophenone ("ABP"—25% solution in ethyl acetate), and 1.01 grams VAZO™ 64 (2,2'-azobis (isobutyronitrile), an initiator commercially available from duPont). This solution was agitated at 150 RPM.

This solution was heated to reflux and the remaining acrylate monomer mixture was added dropwise over a period of 60 minutes to the flask through an addition funnel. Once all of the acrylate monomer mixture was added, the solution was allowed to reflux for 3 hours while the agitation of the solution was increased to 350 RPM. Once cooled to room temperature, the inherent viscosity of the polymer at room temperature in ethyl acetate was measured at a concentration of 0.5 g/dl at room temperature. The inherent viscosity was 0.5 dl/g.

A tackified solution adhesive was then prepared by adding 20 parts per hundred parts acrylate (alkyl acrylates and comonomers) of the hydrocarbon resin described above to this solution. The tackified solution adhesive was then coated on a clear polyvinyl chloride film (Scotchcal™ #3334, commercially available from 3M Co.) and oven dried to give a dried coating thickness of about 40 µm. The dried adhesive coating was crosslinked by exposure to high intensity UV light (medium pressure mercury lamps, no inerting) using a dose of about 100 mJ $cm^{-2}$ to prepare a tape sample. The tape sample was applied to a painted metal test panel (E-176, a basecoat/clear coat automotive paint commercially available from BASF) using a 2 kg hard rubber covered metal roller (3 passes) and tested for 180° peel adhesion at a peel rate of 30 cm $sec^{-1}$ as described above. The results of these tests can be found in Table 5.

COMPARATIVE EXAMPLE C9 AND C10

Comparative Example C9 was prepared, coated and tested in accordance with Example 7, except that the hydrocarbon resin of Example 7 was replaced with a hydrogenated rosin-based tackifying resin (Foral™ 85, a hydrogenated wood rosin commercially available from Hercules, Inc.). Comparative Example C10 was similarly prepared, coated and tested, but no tackifying resin was added to the solution adhesive composition. The results of these tests can be found in Table 5.

TABLE 5

| | Peel Adhesion (dwell time and aging conditions, in N/dm) | | |
|---|---|---|---|
| Example | 20 min., RT | 3 days, RT | 7 days, 70° C. |
| 7 | 89.8 | 99.5 | 129.8 |
| C9 | 69.7 | 76.0 | 118.4 |
| C10 | 53.1 | 66.0 | 98.9 |

These results clearly indicate that the tackified adhesive composition of Example 7 demonstrates superior aged peel properties in this polar acrylate adhesive composition. Additionally, Example 7 possessed a clarity similar to the non-tackified Comparative Example C10, while Example C9 exhibited some slight yellowing.

EXAMPLE 8–10 AND COMPARATIVE EXAMPLE C11

Tackified water-dispersible pressure-sensitive adhesive compositions were prepared according to the method of U.S. Pat. No. 4,569,960 (Blake) from 100 parts of a solution polymerized 75:25 n-butyl acrylate:acrylic acid copolymer, 85 parts phosphoric acid ester (Rhodafac™PE-510, a free acid of a complex organic phosphate ester commercially available from Rhone-Poulenc) and 3.6 parts alkali-metal hydroxide (potassium hydroxide). Various amounts of the above-described hydrocarbon resin and a partially hydrogenated rosin tackifier (Foral™ AX, commercially available from Hercules, Inc.—Comparative Example C11) were added as specified in Table 6 to these adhesive compositions. These tackified compositions were applied using a knife coater at a thickness of 50–60 µm onto 8.1 kg/ream Cristex™ tissue paper (commercially available from Crystal Paper Co.). Tape samples approximately 2.5×10.2 cm were prepared and tested for immediate 180° peel adhesion as described above to both stainless steel ("SS") and polyester fabric ("PET", commercially available as WrapTel T™ from Standard Textiles) test substrates.

Additionally, these samples were subjected an industrial laundering test. The laundering tests were performed as follows: Tape samples were placed in a 80° C. solution of 1 gram of a fabric detergent in 200 ml of deionized water (pH=10.0) for 30 minutes. Laundered samples were rated from 1 (poor) to 5 (excellent), dependent on the amount of adhesive residue found on the sample following laundering. A rating of "5" was only given when no adhesive residue could be found on the laundered sample, while a "1" rating indicates no evidence of adhesive dissolution. An intermediate score indicates some clumping of tape or paper fibers.

TABLE 6

| Ex. | Tackifier (parts by wt.) | Peel Adhesion (SS, N/dm) | Peel Adhesion (PET, N/dm) | Water Dispersibility |
|---|---|---|---|---|
| 8 | 12.3 | 64.1 | 11.6 | 5 |
| 9 | 24.6 | 81.0 | 15.3 | 5 |
| 10 | 36.9 | 83.2 | 10.4 | 5 |
| C11 | 24.6* | 49.9 | 10.3 | 3 |

*Foral ™ AX

These results clearly indicate excellent performance by the water-dispersible tackified pressure-sensitive adhesives of the present invention. Both peel adhesion and water dispensability are enhanced over the rosin tackified formulation. Furthermore, these results are a further demonstration of this unique combination of a hydrogenated hydrocarbon tackifying resin providing superior properties and compatibility in a highly polar acrylate pressure-sensitive adhesive composition.

EXAMPLE 11 AND COMPARATIVE EXAMPLE C12–C19

The following examples illustrate the chemical inertness of the tackifying resins of the present invention versus other classes of commercially available synthetic hydrocarbon tackifiers used in acrylate pressure-sensitive adhesive formulations. In all of these examples, a 90/10 IOA/AA monomer mixture was bulk polymerized using the UV polymerization method of Example 1, except that no crosslinking agents were used (i.e., no triazine or 1,6-hexanediol diacrylate). Comparative Example C12 was prepared without any tackifying resin, while 20 parts of the tackifying resins specified in Table 7 were added to the monomer mixtures of Example 11 and Comparative Examples C13–C19 prior to polymerization. No crosslinking agent was used, so the examples could be analyzed by gel permeation chromatography (GPC) in tetrahydrofuran against a polystyrene standard for differences in molecular weight. The samples were also checked for clarity after polymerization. The results are shown below in Table 7. Prior to polymerization all of the samples were clear.

TABLE 7

| Ex. | Tackifier used | Mz from GPC | Optical clarity |
|---|---|---|---|
| 11 | Hydrocarbon Resin | 725,000 | clear, colorless |
| C12 | None | 1,800,000 | clear |
| C13 | Foral ™ 85 | 180,000 | clear, slight yellow |
| C14 | Regalrez ™ 1018[1] | 1,360,000 | hazy |
| C15 | Regalrez ™ 1094[2] | 1,200,000 | cloudy |
| C16 | Regalrez ™ 3102[2] | 1,250,000 | cloudy |
| C17 | Regalrez ™ 6108[4] | 1,530,000 | cloudy |
| C18 | Escorez ™ 5380[5] | 1,700,000 | hazy |
| C19 | Escorez ™ 5300[6] | 1,825,000 | cloudy |

[1]crystal-clear hydrocarbon tackifying resin having a softening point (ring and ball) of 16–20° C. commercially available from Hercules, Inc.
[2]crystal-clear hydrocarbon tackifying resin having a softening point (ring and ball) of 90–98° C. commercially available from Hercules, Inc.
[3]crystal-clear hydrocarbon tackifying resin having a softening point (ring and ball) of 98–106° C. commercially available from Hercules, Inc.
[4]crystal-clear hydrocarbon tackifying resin having a softening point (ring and ball) of 104–112° C. commercially available from Hercules, Inc.
[5]hydrogenated cyclodiene tackifying resin having a softening point (ring and ball) of 79–90° C. and a Gardner Color of <1 in 50% toluene solution, commerically available from Exxon Chemicals Co.
[6]hydrogenated cyclodiene tackifying resin having a softening point (ring and ball) of 105° C. and a Gardner Color of <1 in 50% toluene solution, commerically available from Exxon Chemicals Co.

The results show that other synthetic tackifiers (Comparative Examples C14–C19) have poor compatibility in this more polar, acrylic adhesive and become immiscible following polymerization. Regalrez™ 1018 and Regalrez™ 1094 tackifiers are fully hydrogenated; Kegalrez™ 3102 and Regalrez™ 6108 tackifiers are partially hydrogenated.

EXAMPLES 12–14

A 96:4 isooctyl acrylate:methacrylic acid suspension pressure-sensitive adhesive, using 0.5% by weight ZnO suspension stabilizer, was prepared according to the method of Example 5 of U.S. Pat. No. 4,952,650 (Young et al.), hereby incorporated by reference. Portions of this suspension pressure-sensitive adhesive were tackified using 10, 20, and 30 pph of the hydrocarbon resin to form Examples 12, 13 and 14, respectively. All examples demonstrated acceptable immediate and aged adhesion to skin.

EXAMPLE 15 AND COMPARATIVE EXAMPLE C20

93.5/6.5 IOA/AA adhesive compositions tackified with 10 parts of the hydrocarbon resin (Example 15) and Foral™ 85 (Comparative Example C20) were coated at a thickness of 100 μm (4 mils) on a 37.7 μm (1.5 mil) primed PET backing and cured and crosslinked using 0.15% by weight of a triazine (2,4-bis(trichloromethyl)-6-(3,4-dimethoxy phenyl)-s-triazine crosslinker and low intensity UV light (510 mJ/cm$^2$ PR units and a flat intensity profile of 3.2 mW/cm$^2$). Once cured, these adhesives were transferred to a 50 μm (2 mil) aluminum foil backing. These samples were subjected to 90° peel adhesion and shear adhesion tests as specified above from a variety of substrates ("SS"=stainless steel; "PC"=polycarbonate; "PP"=polypropylene). A 1 kg load was used for room temperature (RT) shear results, while a 500 gram load was employed for 70° C. shear. The test results are shown below in Table 8:

TABLE 8

| Test used | Example 15 (N/dm) | Example C20 |
|---|---|---|
| Initial peel, SS | 72.9 | 73.1 |
| 3 day RT peel, SS | 135.9 | 109.7 |
| 3 day 70° C. peel, SS | 146.7 | 129.6 |
| Initial peel, PC | 79.0 | 76.6 |
| 3 day RT peel, PC | 87.1 | 85.8 |
| 3 day 70° C. peel, PC | 47.7 | 42.7 |
| Initial peel, PP | 51.9 | 47.9 |
| 3 day RT peel, PP | 61.1 | 60.2 |
| 3 day 70° C. peel, PP | 54.5 | 64.1 |
| RT shear, SS (min.) | 10,000+ | 1,255* |
| 70° C. shear, SS (min.) | 3,413* | 23* |

*Cohesive failure of the PSA

Table 8 indicates that the tackified composition of the present invention at least matches a hydrogenated rosin ester based tackifier, in terms of peel adhesion improvement on different surfaces. A surprising result is the dramatic increase in shear strength when the hydrocarbon resin is present during the bulk polymerization. It is believed that this shear enhancement is a result of the very limited interference of this class of hydrocarbon resins with this type of polymerization.

EXAMPLES 16–17 AND COMPARATIVE EXAMPLES C21–C22

This set of examples illustrate the preparation of heat activatable tackified acrylic adhesive compositions in formulations containing isobornyl acrylate (IBA) as a reinforcing comonomer. Two solution polymers were made by polymerizing 50/10/40/0.2 IOA/AA/IBA/ABP (Comparative Example C21) and a 50/10/40/0.2 BA/AA/IBA/ABP (Comparative Example C22) monomer compositions at 30% solids in ethylacetate according to the method of U.S. Pat. No. Re 24,906 (Ulrich). The polymerization was initiated with 0.3% by weight (based on the monomers) of VAZO™ 64 and the reaction was run for about 20 hours at 55° C. under inert atmosphere. A portion of Comparative Example C21 was tackified with 20 parts per hundred (based on solids) of the hydrocarbon resin, resulting in tackified acrylic adhesive Example 16. Similarly, Example 17 was prepared by tackifying a portion of Comparative Example C22 with 20 parts per hundred of the hydrocarbon resin.

All four samples were coated on 38.1 micron primed polyester (PET) and oven-dried. A dry adhesive thickness of about 25.4 micron was obtained. All tape samples were clear and essentially non-tacky. Although ABP (4-acryloxybenzophenone) was incorporated into the adhesive to allow for UV crosslinking, no UV cure was used.

1.25 cm wide adhesive tape strips were prepared of each of these compositions and the tapes strips were heat-laminated to stainless steel test panels for 180° peel adhesion and shear adhesion testing. The samples were heat laminated at 90° and 110° C. by running the tape/test panel construction through the heated nip of a laminator (average residence time under the nip of 2 to 3 seconds). For the peel adhesion testing, 228 cm min$^{-1}$ peel rate was used while the static shear testing involved samples having 1.25 cm×1.25 cm overlap with the test panel and a 1 kg load applied to the free end of the tape sample.

At 90° C., only tackified Examples 16 and 17 could be applied successfully, as demonstrated by peel testing which tore the backing. The non-tackified Comparative Examples C21 and C22 applied at this temperature were tested and gave 180 peel values of about 1.1 N/dm. Comparative Examples C21 and C22 did not attain this level of peel adhesion (i.e., the PET backing tore) until the lamination temperature was increased to about 110° C.

Static shear was also measured for both the tackified and non-tackified examples. No shear failure was observed for Examples 16–17 and Comparative Examples C21–C22 and the test was discontinued after 10,000 minutes. These experiments clearly show that the hydrocarbon resin tackifier can be used successfully in a heat-activatable adhesive composition. The tackified heat-activatable adhesives maintain the optically clarity and shear strength typical of non-tackified acrylic adhesive compositions, but the application temperature can be advantageously reduced without adversely affecting peel performance.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

We claim:
1. A clear and essentially colorless adhesive comprising (A) the polymerization reaction product of starting materials comprising:
   (a) 25 to 95 parts by weight of a polymerizable component comprising at least one acrylic or methacrylic ester of a non-tertiary alkyl alcohol in which the alkyl group contains 4 to 20 carbon atoms; and
   (b) at least 5 parts by weight of at least one copolymerizable polar comonomer having a strong hydrogen bonding capability selected from an acid, an amide, an anhydride, or a lactam, the sum of (a) and (b) amounting to 100 parts by weight; and
   (B) 1 to 75 parts by weight, per 100 parts by weight of the sum of components (a) and (b), of a tackifier;
   said tackifier comprising a water white, hydrogenated resin produced from a hydrocarbon feedstock containing at least 50 percent vinyl aromatic monomer and from 0 to 40 percent by weight of olefin chain transfer agents, said tackifier having:
   (i) a retained aromaticity on a weight percent of monomers in the feedstock basis of 80 to 95 percent;
   (ii) a softening point of 65° to 120° C.;
   (iii) a Mz of less than 1800;
   (iv) no molecular weight fractions above 7000; and
   (v) a polydispersity of less than 2.5, wherein said starting materials (a) and (b) are substantially solvent free.

2. The adhesive of claim 1, wherein said tackifier has a softening point of 65° to 100° C.

3. The adhesive of claim 1, wherein the adhesive comprises 2 to 50 parts by weight of the tackifier.

4. The adhesive of claim 1, wherein the adhesive comprises 3 to 45 parts by weight of the tackifier.

5. The adhesive of claim 1, wherein the adhesive comprises 5 to 30 parts by weight of the tackifier.

6. The adhesive of claim 1, wherein said tackifier has a Mz of less than 1500.

7. The adhesive of claim 1, wherein the tackifier has a Mz of less than 1200.

8. The adhesive of claim 1, wherein the tackifier has a Mz of less than 1000.

9. The adhesive of claim 1, wherein the tackifier has a Mz of from 700 to 1100.

10. The adhesive of claim 1, wherein the tackifier is the tackifier having all of the properties as described in Table 2—Hydrocarbon Resin Properties.

11. The adhesive of claim 1, wherein said starting materials further comprise a polymerization initiator.

12. The adhesive of claim 1, wherein said starting materials further comprise a thermal initiator or a photoinitiator in an amount effective to polymerize said polymerizable components (a) and (b).

13. The adhesive of claim 1, wherein component (a) comprises at least one acrylic or methacrylic ester of a non-tertiary alkyl alcohol selected from n-butyl acrylate, n-hexyl acrylate, n-octyl acrylate, isooctyl acrylate, 2-ethylhexyl acrylate, isononyl acrylate, n-decyl acrylate, or n-dodecyl acrylate.

14. The adhesive of claim 1, wherein component (b) comprises at least one reinforcing monomer selected from acrylic acid, methacrylic acid, itaconic acid, N-vinyl pyrrolidone, N-vinyl caprolactam, an N,N-dimethyl acrylamide, acrylonitrile, 2-carboxyethyl acrylate, maleic anhydride, or isobornyl acrylate.

15. The adhesive of claim 1, wherein said starting materials further comprise a crosslinking agent.

16. The adhesive of claim 1, wherein said adhesive is a pressure sensitive adhesive.

17. The adhesive of claim 1, wherein said adhesive is a heat activatable adhesive.

18. A sheet material comprising a tape backing or release liner and a layer of the adhesive of claim 1.

19. A sheet material comprising a tape backing or release liner and a layer of the adhesive of claim 1 coated on a major surface thereof, wherein said tape backing or release liner is selected from a paper, a nonwoven, or a polymeric film.

20. The adhesive of claim 1, wherein said adhesive is in the form of a sheet material.

21. The adhesive of claim 1, wherein the polymerization reaction product is produced by exposing the starting materials to ultraviolet radiation.

22. The adhesive of claim 1, wherein component (b) comprises at least one polar comonomer selected from a $C_1$ to $C_3$ alkyl acrylate and a $C_1$ to $C_3$ vinyl ester.

23. A construction comprising a substrate and the adhesive of claim 1, wherein the substrate is a thermoplastic olefin polymer, thermoplastic urethane polymer, automotive paint, or diene monomer rubber.

24. The adhesive of claim 1, wherein component (b) comprises acrylic acid.

25. The adhesive of claim 1, wherein component (a) comprises at least one of isooctyl acrylate, 2-ethylhexyl acrylate, or n-butyl acrylate.

26. The adhesive of claim 1, wherein component (b) comprises isobornyl acrylate.

27. A sheet material comprising a layer of foam material and a layer of the adhesive of claim 1.

* * * * *